March 26, 1963 D. J. HAMMERAND 3,082,642

KNOB ASSEMBLY FOR GUIDED LINK

Filed March 13, 1961 2 Sheets-Sheet 1

INVENTOR.
Donald J. Hammerand
BY
James T. Burr
ATTY.

March 26, 1963 D. J. HAMMERAND 3,082,642

KNOB ASSEMBLY FOR GUIDED LINK

Filed March 13, 1961 2 Sheets-Sheet 2

INVENTOR.
Donald J. Hammerand
BY
James T. Barr
ATTY.

3,082,642

KNOB ASSEMBLY FOR GUIDED LINK

Donald J. Hammerand, Franklin Park, Ill., assignor to Admiral Corporation, Chicago, Ill., a corporation of Delaware Filed Mar. 13, 1961, Ser. No. 95,246
5 Claims. (Cl. 74—543)

The present invention relates to a knob assembly for securing a linkage rod to a slotted plate and defining therewith a path along which said linkage rod may be moved.

The invention is particularly applicable to apparatus such as a phonograph record player in which a linkage rod extends beneath a base plate, or "pan," between a control mechanism and a control knob manually operable from above the pan. One disadvantage of automatic record players of prior construction has been the dispersed arrangement of controls for regulating turntable speed, on-off, and reject features. These controls have required a large amount of space in view of the limited space available on the base plate of a record player. Prior record player controls have been relatively difficult to assemble and relatively expensive to manufacture.

However, due to the present invention, the speed control for a turntable and the on-off reject control may be grouped on the base plate of a record player in a smaller space than was required by prior controls. In addition the present invention permits a reduction in size of phonograph record player controls and a neater, more attractive record player appearance. Costs of manufacture and assembly are considerably reduced by the present invention.

Therefore, it is an object of this invention to provide automatic record player controls that may be grouped at a single locality on the base plate.

Another object of this invention is to improve the neatness of appearance of automatic record players.

A further object of this invention is to provide a knob assembly that will secure a linkage rod to the base plate of a record player while insulating the base plate from vibrations occurring in the linkage rod.

Still another object of this invention is to reduce the cost of manufacture and time required for assembly of parts for apparatus such as an automatic record player.

More specifically it is an object of this invention to provide a knob assembly for a linkage rod which requires no screws or separate fastening devices to secure the knob assembly in position on its associated plate.

Other objects and advantages of this invention will become apparent from an examination of the following description taken in conjunction with the accompanying drawings wherein.

Figures 1, 2, 3, 4, 5, 6:
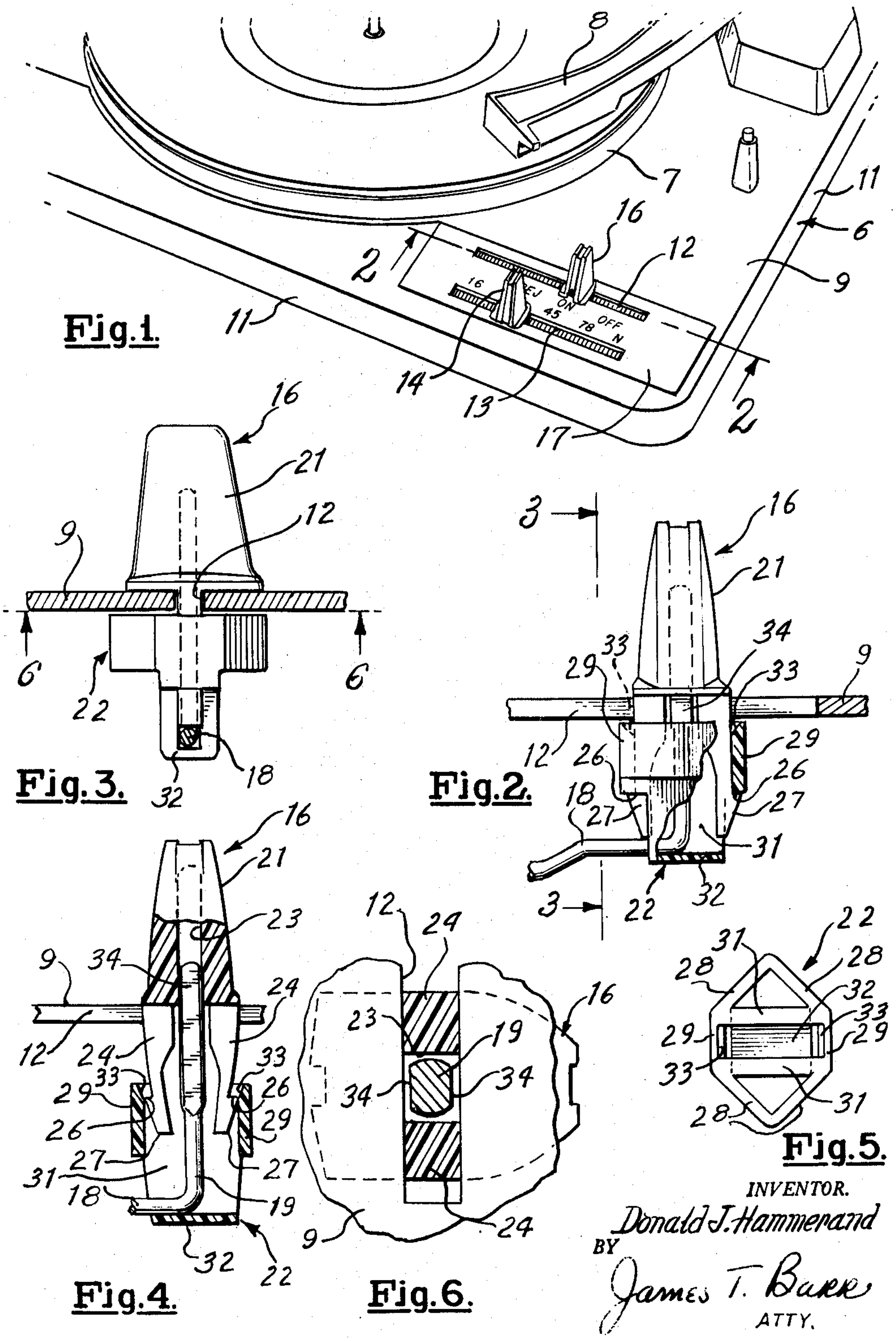
FIG. 1 is a fragmentary perspective view of an automatic record player in which the present invention is incorporated.
FIG. 2 is a fragmentary vertical section taken on line 2—2 of FIG. 1 to show the knob assembly in greater detail.
FIG. 3 is a fragmentary vertical section taken on line 3—3 of FIG. 2.
FIG. 4 is a vertical elevation, partially in section, of the knob assembly in a preassembled position.
FIG. 5 is a top plan view of the lower or base portion of the knob assembly.
FIG. 6 is a horizontal section taken on line 6—6 of FIG. 3.

Now, referring in greater detail to the drawings, wherein like elements are designated by like reference numerals, FIG. 1 shows an automatic record player mechanism which includes a base plate 6, a turntable 7, and a pick-up arm 8. The base plate 6, which is formed of sheet metal, has a more-or-less rectangular top section 9 formed with a depending flange portion 11 about its periphery. At one corner thereof, the top section 9 is formed with a pair of linear slots 12 and 13 parallel one to another. The slots 12 and 13 act as guide tracks to limit and define the movement of a pair of manual control knobs 14 and 16 which are received in the slots 12 and 13 in such manner as to be secured to the base plate 6. Knob 14 rides in slot 13 while knob 16 rides in slot 12, the position of each knob along its guide track determining the operative condition of its respective control mechanism. The base plate 6 bears indicia adjacent the slots 12 and 13 to identify the knob positions corresponding to different control mechanism operative conditions. As shown, slot 12 is marked with a "Reject" position, an "On" position, and an "Off" position. Slot 13 is marked with turntable speeds of 16, 33, 45, 78 and neutral. Each of the knob assemblies 14 and 16 is secured to a terminal portion 34 of a linkage rod 18 which extends in more-or-less parallel fashion to its associated slot.

Since the knob assemblies 14 and 16 are of identical form for association with linkage rods 18 having identical terminal configurations, only control knob 16 will be described in detail. Knob 16 includes a handle portion 21 overlying the top section 9 at slot 12 and a base portion 22 embracing the under surface of top section 9. The base plate 6 is disposed loosely (not in clamped relation) between the overlapping portions of handle 21 and base portion 22.

The handle portion 21 possesses a vertical, axial bore 23 of complementary configuration with the flattened, up-turned terminal portion 34 of the linkage rod 18. Straddling the bore 23 and extending downwardly therefrom are a pair of legs 24 integral with the handle portion 21 and of width slightly less then the width of slot 12; whereby the legs 24 may extend through the slot 12 without binding while, at the same time, providing lateral rotational stability to the knob and rod assembly. When the handle is in its assembled position on the base plate 6, two hook portions 26, one on each of the legs 24, are spaced below top section 9. The hook portions 26 extend away from one another and are partly defined by cam surfaces 27 which converge toward the lower extremities of the legs 24. The main body of the knob base portion 22, which is disposed in its assembled position adjacent to top section 9, has six walls, designated by the numerals 28 and 29, which define a substantially hexagonal structure (see FIG. 5). Extending between two opposed walls 29 of the hexagonal structure is a pair of partition walls 31 which are spaced apart to afford passage of the legs 24 and hooks 26 therebetween. The partitions 31 continue downwardly below the hexagonal main body of the base portion 22 and walls 28 and 29 to form a stirrup portion 32 integral with the body portion.

Both the handle portion 21 and base portion 22 are formed of a plastic material such as nylon which is partially resilient. The material of construction must have good vibration absorbing qualities and be readily moldable.

The space between the opposed walls 29 is less than the distance between the outer extremities of hooks 26 in the unassembled position, but is slightly greater then the distance between the lower extremities of the cammed portions of the hooks 26. Thus, during assembly the legs 24 may be forced downwardly into the space between walls 29, the legs being resiliently urged together by the action of their cam surfaces 27 against the walls 29. To aid this camming action, the walls 29 are bevelled on their inner sides (as shown in FIG. 4 at 33). During assembly the hook portions 26 slide downwardly between the walls 29 until reaching the bottom of the walls 29, at which time the legs 24 spring outwardly to latch the handle portion 21 to the base portion 22.

However, before handle portion 21 and base portion 22 are joined, the linkage rod 18 is first positioned in the stirrup portion 32. The terminal portion 34 of the linkage rod 18 is upturned at a right angle and extends upward between opposed partition walls 31 and opposed walls 29 and bears against the bottom segment of the stirrup 32. Terminal portion 34 is flattened to conform to the configuration of bore 23 and fit snugly therein after assembly. This flattened configuration also permits the rod to extend through the slot 12 between the legs 24 without contacting the slot edge portions of the base plate 6 because the width of the flattened terminal portion 34 is less than the width of the legs 24. Vibrations that may occur in the linkage rod 18 are absorbed by the plastic in the knob assembly. During assembly, as the hooks 26 are being forced downwardly with respect to the base portion 22, the linkage rod 18 is being forced upwardly by the bottom section of stirrup 32 with respect to the handle portion 21 until an assembled position is reached in which the hook portions 26 are resiliently snapped over the lower edges of walls 29, and the upturned terminal portion 34 of the linkage rod 18 extends fully into the bore 23. In the assembled position the lower end of one of the legs 24 bears against the horizontal rod portion 18 to clamp it against the lower portion of stirrup 32 and further reinforce the connection between the knob assembly and the linkage rod 18 in the assembled position. As the knob assembly is moved manually along its associated slot, the linkage rod moves therewith and a control function mechanism associated with the other end of the linkage rod is caused to change its operative condition.

Figures 7, 9:
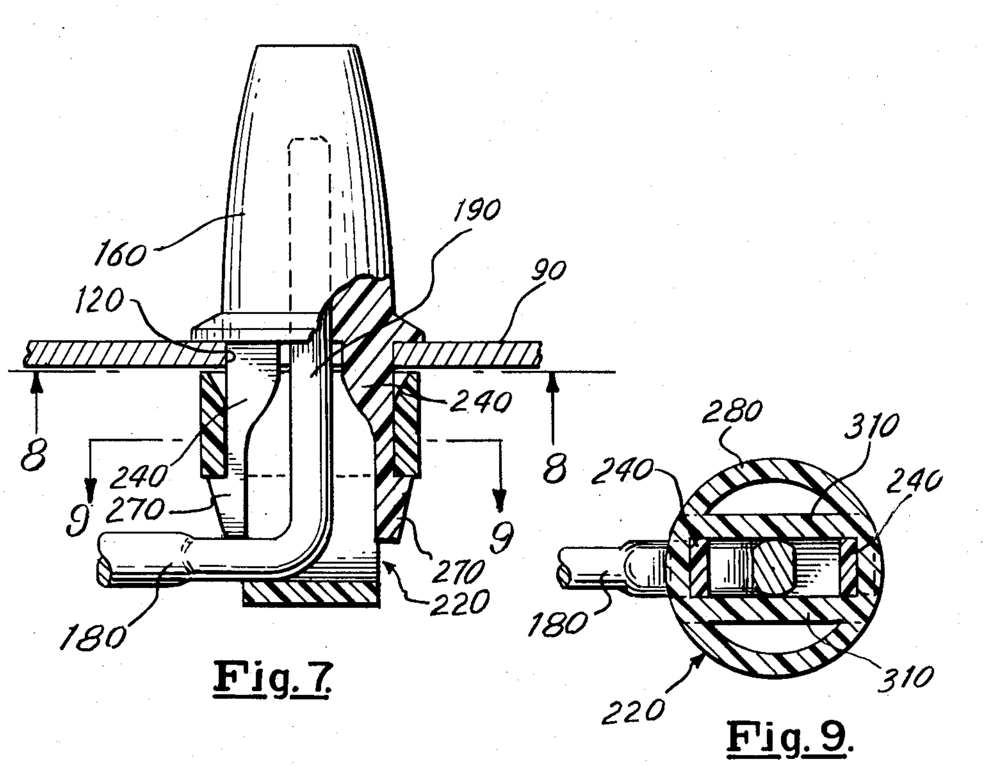
FIG. 7 is a fragmentary view corresponding to FIG. 2 showing a second embodiment of the present invention.
FIG. 9 is a horizontal section taken on line 9—9 of FIG. 7.
Figure 8:
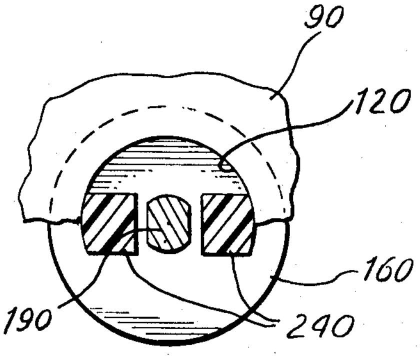
FIG. 8 is a horizontal section taken on line 8—8 of FIG. 7.
Figure 10:
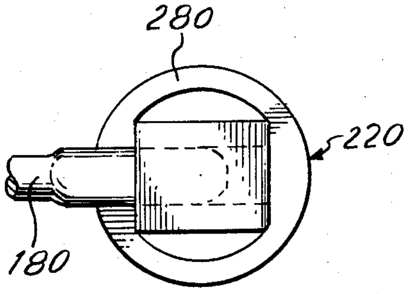
FIG. 10 is a bottom plan view of the elements shown in FIG. 7, the base plate having been removed.

The alternative knob construction shown in FIG. 7 includes handle portion 160 and base portion 220. The top section 90 in accordance with this embodiment is formed with a circular aperture 120. The handle 160 is provided with a pair of spaced apart leg portions 240, the outermost surfaces of which are curved to fit the circular aperture 120 for rotation therein. The legs 240 extend below top section 90, terminating in hook portions 270 by which the knob base portion 220 is secured to handle portion 160 in similar manner to the first described embodiment of this invention. The main body 280 of the base 220 is circular instead of hexagonal, but it includes a pair of parallelly opposed walls 310 between which a terminal portion 190, of a linkage rod 180, extends into the handle portion 160 in like manner to the first described embodiment. The rod supporting base portion 220 urges the linkage rod 180 into engagement with one of the legs 240, while the top section 90 is disposed between portions of the base portion 220 and handle portion 160 that overlap the edges of the circular aperture 120 to maintain the knob in position on the top section 90. In this second embodiment the knob is turned to swing the linkage rod angularly, as opposed to the linear knob movement of the first embodiment.

Although only two embodiments of the present invention have been described, it is obvious that numerous modifications and substitutions could be made in these embodiments without deviating from the spirit and scope of the present invention. It is not intended to exclude these modifications and substitutions from the coverage of the appended claims.

Now, therefore, what is claimed is:

1. In combination with a plate-like member having an aperture therein and a rod formed with a terminal leg bent normal to the main portion of its length and to said plate-like member, a knob assembly comprising: a handle having a base larger than said aperture overlying said aperture on one side of said plate-like member; a carrier having a body larger than said aperture overlying said aperture on the other side of said plate-like member; an aperture in said carrier; a pair of legs on said handle passed through said aperture in said plate-like member and said aperture in said carrier, said pair of legs being in spaced relation to accommodate said terminal leg therebetween; anchor means on one end of each of said pair of legs engaging said carrier and securing said handle thereto and securing said knob assembly in said aperture in said plate-like member; and a stirrup-like configuration on said carrier having side walls and a bottom wall, said bottom wall supporting said rod and urging said rod against one end of one of said pair of legs, whereby said rod is secured in said knob assembly.

2. In combination with a plate-like member having an aperture therein and a rod formed with a terminal leg bent normal to the main portion of its length and to said plate-like member, a knob assembly comprising: a handle having a base larger than said aperture overlying said aperture on one side of said plate-like member; a carrier having a body larger than said aperture overlying said aperture on the other side of said plate-like member; an aperture in said carrier; a pair of legs on said handle passed through said aperture in said plate-like member and said aperture in said carrier, said pair of legs being in spaced relation to accommodate said terminal leg therebetween; anchor means on one end of each of said pair of legs engaging said carrier and securing said handle thereto and securing said knob assembly in said aperture in said plate-like member; a stirrup-like configuration on said carrier having side walls and a bottom wall, said bottom wall supporting said rod and urging said rod against one end of one of said pair of legs, whereby said rod is secured in said knob assembly; and a bore in said handle having a complementary cross-section with the cross-section of said terminal leg of said rod for preventing angular displacement of said handle with respect to said terminal leg.

3. In combination with a plate-like member having a predetermined thickness and an aperture therein and a rod formed with a terminal leg bent normal to the main portion of its length and to said plate-like member, a knob assembly comprising: a handle having a base larger than said aperture overlying said aperture on one side of said plate-like member; a carrier having a body larger than said aperture overlying said aperture on the other side of said plate-like member and of a predetermined thickness; an aperture in said carrier; a pair of legs on said handle passed through said aperture in said plate-like member and said aperture in said carrier, said pair of legs being in spaced relation to accommodate said terminal leg therebetween; anchor means on one end of each of said pair of legs engaging said carrier and securing said handle thereto, said pair of legs being longer than the thickness of said plate-like member and said carrier body, whereby said knob assembly is freely secured in said aperture in said plate-like member; and a stirrup-like configuration on said carrier having side walls and a bottom wall, said bottom wall supporting said rod and urging said rod against one end of one of said pair of legs, whereby said rod is secured in said knob assembly.

4. In combination with a plate-like member having a slot therein and a rod formed with a terminal leg bent normal to the main portion of its length and to said plate-like member, a knob assembly comprising: a handle having an enlarged base overlying said slot on one side of said plate-like member; a carrier having an enlarged body overlying said slot on the other side of said plate-like member; an elongated aperture in said carrier; a pair of legs on said handle passed through said slot and said aperture, said pair of legs being in spaced relation to accommodate said terminal leg therebetween and to prevent rotational movement of said handle relative to said slot; anchor means on one end of each of said pair of legs engaging said carrier and securing said handle thereto and securing said knob assembly in said slot; and a stirrup-like configuration on said carrier having side walls and a bottom wall, said bottom wall supporting said rod and urging said rod against one end of one of said pair of legs, whereby said rod is secured in said knob assembly.

5. In combination with a plate-like member having a predetermined thickness and a slot therein and a rod formed with a terminal leg bent normal to the main portion of its length and to said plate-like member, a knob assembly comprising: a handle having an enlarged base overlying said slot on one side of said plate-like member; a carrier having an enlarged body overlying said slot on the other side of said plate-like member and of a predetermined thickness; an elongated aperture in said carrier; a pair of legs on said handle passed through said slot and said aperture, said pair of legs being in spaced relation to accommodate said terminal leg therebetween and to prevent rotational movement of said handle relative to said slot; anchor means on one end of each of said pair of legs engaging said carrier and securing said handle thereto, said pair of legs being longer than the thickness of said plate-like member and said carrier body, whereby said knob assembly is freely secured in said slot; and a stirrup-like configuration on said carrier having side walls and a bottom wall, said bottom wall supporting said rod and urging said rod against one end of one of said pair of legs, whereby said rod is secured in said knob assembly.

References Cited in the file of this patent

UNITED STATES PATENTS

| | | |
|---|---|---|
| 1,346,130 | Lidseen | July 13, 1920 |
| 2,503,960 | McCullough | Apr. 11, 1950 |
| 2,528,325 | Valprey | Oct. 31, 1950 |
| 2,542,144 | Kearns | Feb. 20, 1951 |
| 2,573,600 | Pruehs | Oct. 30, 1951 |
| 2,592,130 | Erb et al. | Apr. 8, 1952 |
| 2,942,220 | Elliott et al. | June 21, 1960 |
| 2,964,303 | Smith et al. | Dec. 13, 1960 |